US007592929B2

(12) United States Patent
Pepitone

(10) Patent No.: US 7,592,929 B2
(45) Date of Patent: Sep. 22, 2009

(54) RUNWAY AND TAXIWAY TURNING GUIDANCE

(75) Inventor: David Pepitone, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 601 days.

(21) Appl. No.: 11/399,240

(22) Filed: Apr. 6, 2006

(65) Prior Publication Data

US 2007/0240056 A1    Oct. 11, 2007

(51) Int. Cl.
    *G08B 21/00*    (2006.01)
(52) U.S. Cl. .................. 340/945; 340/947; 340/950; 340/954; 701/208; 701/201
(58) Field of Classification Search .......... 340/945, 340/948, 950, 954, 958, 932.2, 932.27; 701/3, 701/201, 208, 211, 213
    See application file for complete search history.

(56) References Cited

U.S. PATENT DOCUMENTS

| 6,282,466 | B1  |   | 8/2001 | Nolte et al. |
|-----------|-----|---|--------|--------------|
| 6,405,975 | B1  | * | 6/2002 | Sankrithi et al. .......... 244/1 R |
| 6,571,166 | B1  | * | 5/2003 | Johnson et al. ........... 701/120 |
| 6,694,249 | B1  | * | 2/2004 | Anderson et al. .......... 701/120 |
| 7,043,342 | B1  |   | 5/2006 | Dewees |
| 7,382,284 | B1  |   | 6/2008 | Armstrong et al. |

OTHER PUBLICATIONS

"Airborne Video Cameras," GMCS, Securaplane Technologies Inc., www.securaplane.com, Feb. 2004, two pages.
"Airbus A380-800F Wide Bodied Freighter, Europe," http://www.aerospace-technology.com/project_printable.asp?ProjectID=3136, printed Apr. 6, 2006, 4 pages.
"Latecoere: a fourth contract for the A380," Mar. 6, 2003, http://www.midipyrenees-explansion.fr/fiches/english/fiche_breve.php?id=107, one page.

* cited by examiner

*Primary Examiner*—Benjamin C Lee
*Assistant Examiner*—Hongmin Fan
(74) *Attorney, Agent, or Firm*—Ingrassia Fisher & Lorenz, P.C.

(57) ABSTRACT

A pilot is maneuvering an aircraft on a ground surface, such as a runway or taxiway. On a cockpit display, the pilot sees a scaled aircraft symbol overlaying a moving map on a cockpit display. The aircraft symbol represents the aircraft, while the moving map represents the ground surface on which the aircraft is located. The aircraft symbol depicts its nose gear and main gear with respect to the ground surface. The nose gear on the aircraft symbol rotates based on tiller angle. The cockpit display also shows edge guidance lines that allow the pilot to line up the main gear, while providing a margin of safety. Predictive symbology also overlays the moving map to provide an indication of whether the aircraft can safely turn on the ground surface.

20 Claims, 10 Drawing Sheets

RUNWAY AND TAXIWAY TURNING GUIDANCE

FIELD

The present invention relates generally to aircraft navigation, and more particularly, relates to providing turning guidance to a pilot who is maneuvering an aircraft on the ground.

BACKGROUND

As air travel increases, both in the number of flights and in the number of destinations, it becomes more likely that a pilot will have to land an aircraft on an unimproved airstrip or runway. Some of these unimproved airstrips are so narrow that the pilot may have difficulty positioning the aircraft for takeoff or for returning to a terminal or other destination point after landing. This is especially true for larger aircraft.

In some cases, the pilot may be forced to make a 180° turn. For example, the pilot may have to taxi to an end of a runway, then execute the 180° turn for takeoff in the opposite direction. However, this maneuver may cause the landing gear (nose gear, main gear, or both) to become stuck off the runway, which may completely shut down an airport until the aircraft can be cleared.

Airplanes have also become stuck off the runway or taxiway at modern airports as well. For example, if an aircraft misses a taxiway turn centerline, the landing gear may get stuck in the grass or mud adjacent to the taxiway. Delays caused by clearing the aircraft may be even more significant at modern airports. Travelers may become frustrated due to the delays and airlines are likely to lose money.

To avoid the problems that occur when an airplane's landing gear gets stuck, some aircraft manufacturers have installed video cameras that allow the pilot to see the landing gear. For example, video cameras have been installed in the Boeing 777 and the Airbus A380 aircraft. Unfortunately, even with the video cameras, pilots may have difficulty with direct visualization due to human factors issues associated with depth perception and off angle viewing. Additionally, ambient conditions, such as lack of light at night and during storms, can make direct visualization difficult with the use of video cameras.

Thus, it would be beneficial to provide the pilot with turning guidance in a manner that the pilot can easily visualize the aircraft's landing gear in relationship to the runway or taxiway edge.

SUMMARY

A system and method for providing runway and taxiway turning guidance is described. In one example, the system includes a display processor that receives data and overlays symbology on a movable map that is displayed on a screen. The symbology includes an aircraft symbol that has a rotatable nose gear. The nose gear rotates as an aircraft represented by the aircraft symbol turns. For example, the nose gear rotates in proportion to a nose gear wheel steering angle.

The received data may include aircraft dimensional data, aircraft turning radius data, runway dimensional data, taxiway dimensional data, and data available from the aircraft. The screen may be a component of a cockpit display. The movable map is an image of a surface on which the aircraft is located, such as a taxiway or a runway. The aircraft symbol may be scaled in size to be proportional to the movable map. Additionally, the aircraft symbol may be semi-transparent so that a relationship between wheels of the aircraft and a surface on which the aircraft is located can be visualized.

The symbology may also include edge markings. The symbology may also include a current nose gear wheel steering angle line and a maximum nose gear wheel steering angle line. A length of the current nose gear wheel steering angle line represents a horizontal distance required to turn the aircraft 180° at a current nose wheel gear steering angle. A length of the maximum nose gear wheel steering angle line represents a horizontal distance required to turn the aircraft 180° at a full tiller nose wheel gear steering angle. The symbology may also include a turn radius trend vector. The symbology may also include a current steering angle.

In another example, a navigation display system includes a screen for displaying data and a display processor for receiving data and providing an output on the screen including symbology. The symbology includes edge markings, an aircraft symbol with landing gear, and a symbol that provides an indication of whether an aircraft can turn on a surface on which the aircraft is located.

A method for providing turning guidance to a pilot who is maneuvering an aircraft on a ground surface includes generating an aircraft symbol that represents the aircraft on the ground surface. The aircraft symbol has a rotatable nose gear. The method also includes superimposing the aircraft symbol over a moving map that represents the ground surface. The aircraft symbol is dimensioned to be substantially proportional to the dimensions of the moving map. The method also includes rotating the nose gear of the aircraft symbol based on a nose gear wheel steering angle input from the aircraft.

The method may also include generating edge markings and superimposing the edge markings on the moving map. The method may also include generating a current nose gear wheel steering angle line and a maximum nose gear wheel steering angle line. A length of the current nose gear wheel steering angle line represents a horizontal distance required to turn the aircraft 180° at a current nose wheel gear steering angle and a length of the maximum nose gear wheel steering angle line represents a horizontal distance required to turn the aircraft 180° at a full tiller nose wheel gear steering angle. The current and maximum nose gear wheel steering angle lines may be superimposed on the moving map.

The method may also include generating a turn radius trend vector and superimposing the turn radius trend vector on the moving map. The method may also include overlaying a current steering angle on the moving map.

By providing turning guidance to pilots, aircraft incidents and accidents may be reduced, which may reduce delays and costs associated with clearing an aircraft when it leaves the runway or taxiway, and gets stuck in the grass or mud. These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
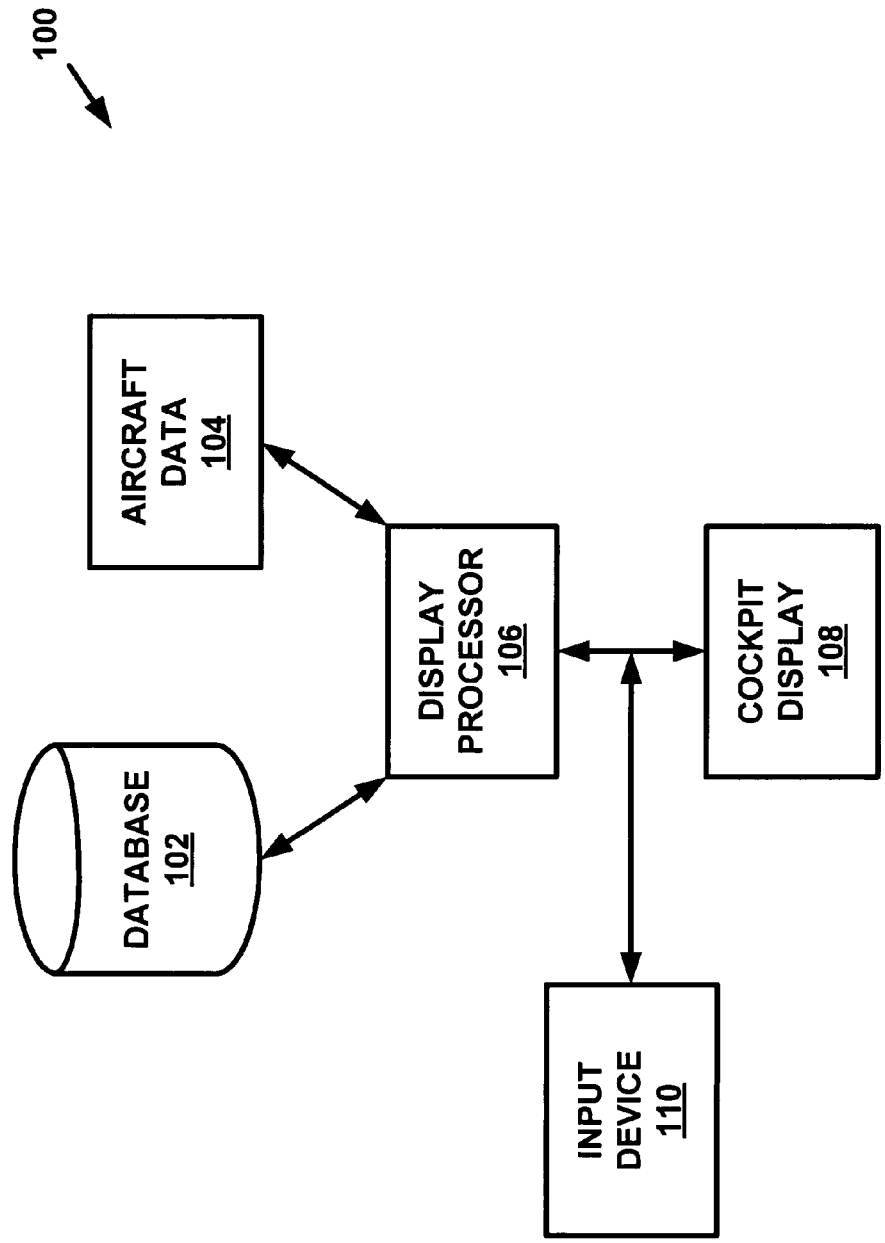
FIG. 1 is a block diagram of a system for providing runway and taxiway turning guidance, according to an example.

FIG. 1 is a block diagram of a system 100 for providing turning guidance to a pilot who is maneuvering an aircraft (sometimes referred to as the pilot's "ownship") on the ground. The aircraft may be on a runway, a taxiway, or other appropriate ground surface, such as a runway holding bay. The system 100 may include any combination of hardware, software, and/or firmware to provide the turning guidance. For example, the system 100 includes data input sources, such as a database 102 and data from the aircraft 104, a display processor 106, a cockpit display 108, and an input device 110. The system 100 may also include additional features, such memory for storing data and executable programs.

The display processor 106 receives data from the database 102 and from the aircraft 106, and generates one or more displays to be presented on the cockpit display 108. The pilot may select the type of display or provide additional information to the display processor using the input device 110. The input device 110 may include one or more buttons or switches on the display 108 or other location within the cockpit, a microphone to receive voice instructions, and/or any other type of input device.

The database 102 may be one or more databases that can store a variety of different data types. Preferably, the database 102 includes aircraft dimensional data, aircraft turning radius data, and runway and/or taxiway dimensions (e.g., length, width, ends, and edges). The aircraft dimensional data and aircraft turning radius data may be obtained from the Federal Aviation Administration (FAA) and aircraft manufacturers. The runway and/or taxiway dimensions may be obtained from airports and Runway Awareness and Advisory System (RAAS) databases, such as Honeywell's RAAS database. The database 102 may include additional data that may be useful for generating turn guidance for the pilot.

The aircraft data 104 is generated by various avionic and/or mechanical systems on the aircraft. For example, GPS data, ground speed data, and nose gear wheel steering angle data are available from the aircraft. The ground speed data may be obtained from an Inertial Reference System (IRS), such as Honeywell's Inertial Laser Reference System. The nose gear wheel steering angle may be available from a cockpit tiller input from the pilot. Additional data may also be available from the aircraft for generating the turning guidance.

Preferably, the display processor 106 is a computer unit that has been programmed to process data and generate a display on the cockpit display 108. The computer unit may be a commercial off-the-shelf computing device or a custom designed computing device. The display processor 106 may generate the displays described herein using techniques substantially the same as known cockpit display systems.

Based on the data received from the database 102, the aircraft 104, and the input device 110, the display processor 106 controls what is presented on the cockpit display 108. In a preferred embodiment, the cockpit display 108 is a moving map display located in the cockpit of the aircraft. However, other displays now known or developed in the future may also be used.

The moving map display includes a screen and a database of maps that depict taxiways, runways, and other terrain that the pilot is likely to encounter when maneuvering the aircraft on the ground. The map depicting the current position of the aircraft is presented on the screen. As the aircraft moves, the moving map display uses the aircraft's position to move the map on the screen accordingly. The moving map display obtains the aircraft's position from sensors on the aircraft, such as the GPS typically located on an aircraft. The moving map display allows symbology generated by the display processor 106 to be overlaid on the moving map.

Figure 2:
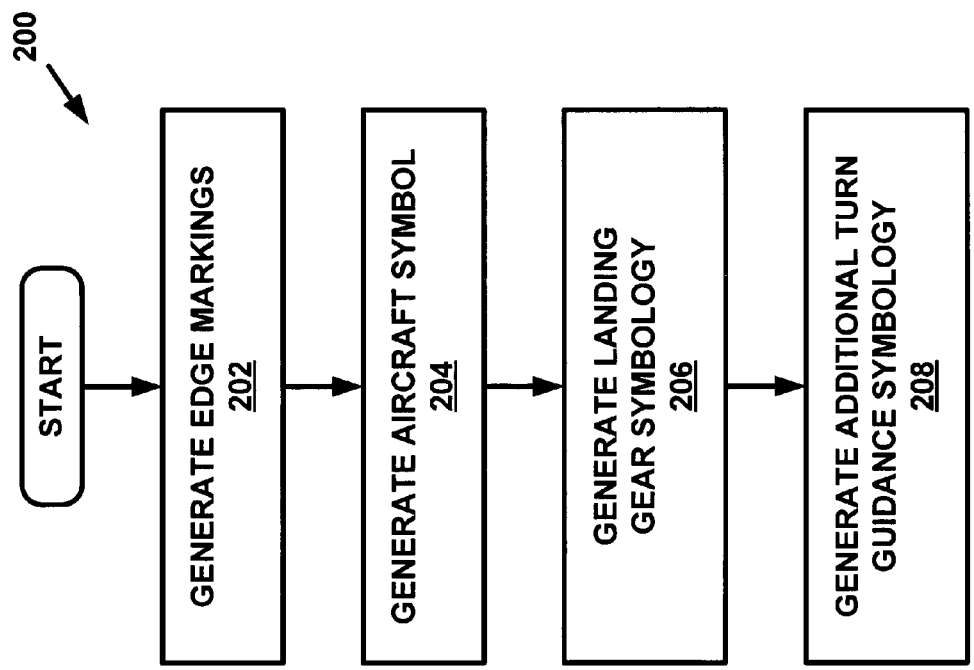
FIG. 2 is a flow chart of a method for providing runway and taxiway turning guidance, according to an example.

FIG. 2 is a flow chart of a method 200 for providing turning guidance to a pilot who is maneuvering an aircraft on the ground. The method 200 includes generating various display symbols to provide turn guidance. However, the method 200 is not limited to any particular order of generating the symbols. Additionally, not all of the symbols need to be generated at one time to provide turn guidance.

At block 202 the method 200 generates edge markings indicating a boundary between a safe surface and an unsafe surface for maneuvering the aircraft. The generated edge markings are then overlaid on the moving map depicted on the cockpit display 108. The edge markings are lines or stripping located on the sides of the surface. In addition to indicating a lack of pavement, the edge markings may guide the pilot away from obstacles located on the surface, such as taxiway lighting, or from areas of the surface that are not structurally strong enough to support an aircraft.

The number of stripes depicted on the cockpit display 108 may also aid the pilot. In the examples described herein, double stripping located at each of the two edges of a surface indicates that the surface is a taxiway, while a single line denotes a runway. This configuration may match the external conditions. However, other edge marking configurations may be used.

Figure 3:
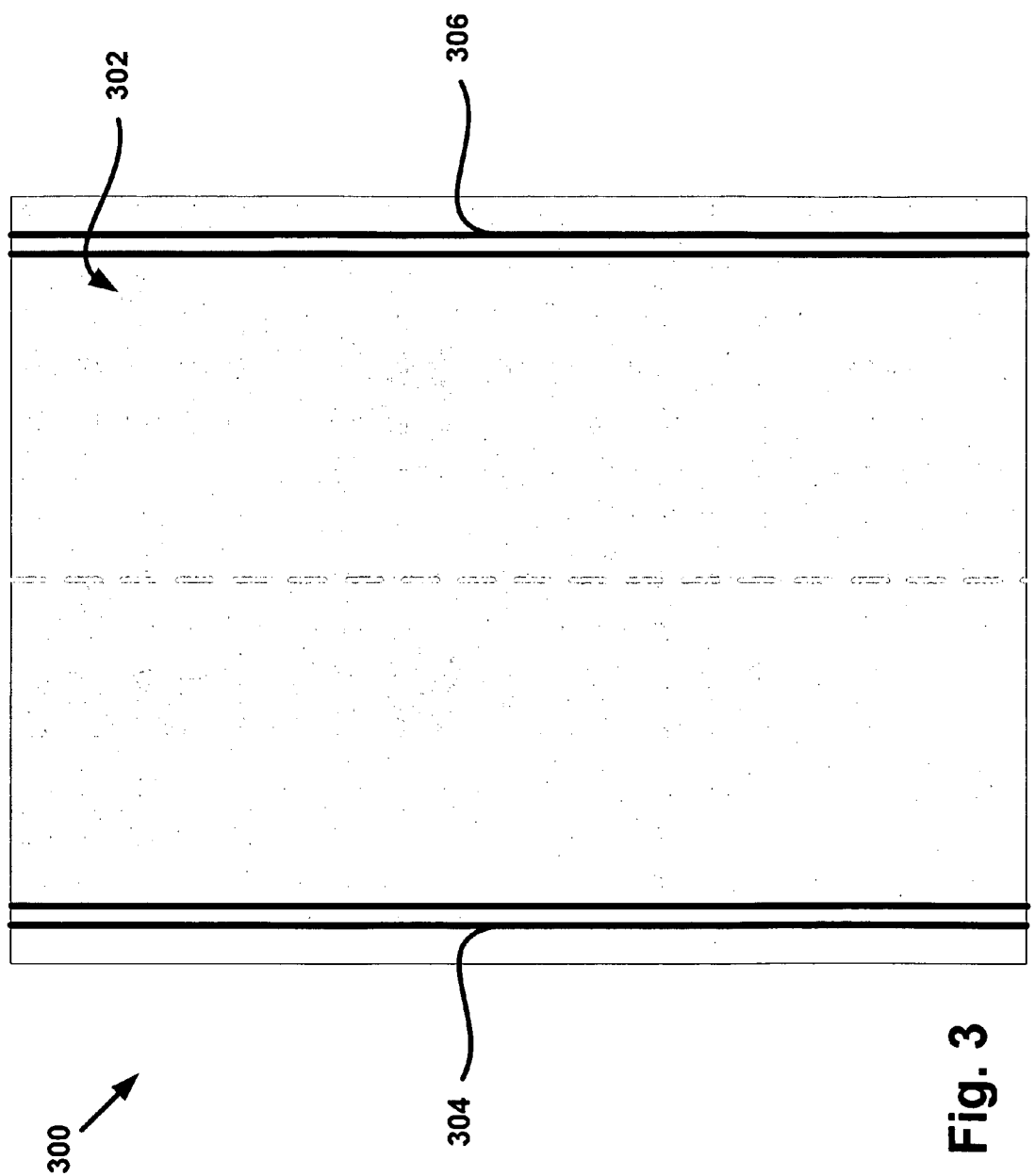
FIG. 3 is an example screenshot of a cockpit display showing taxiway edge markings.

FIG. 3 is an example screenshot 300 of a cockpit display showing taxiway edge markings 304, 306. The cockpit display 108 may present a moving map of a taxiway 302 as the pilot maneuvers the aircraft. The display processor 106 may use airport taxiway survey data to determine where to locate the edge markings 304, 306 on the moving map of the taxiway 302. The survey data may include a boundary setback as determined by the airport's taxiway setback requirements. Additionally or alternatively, the display processor 106 may use external sensors 104, such as a camera, to determine the appropriate location for the taxiway edge markings 304, 306. The display processor 106 then overlays the edge markings 304, 306 over the moving map, and presents the combined image on the cockpit display 108.

Additionally, the color of the edge markings 304, 306 may be varied to distinguish a runway from a taxiway. For example, white stripping may be used for runways, while yellow stripping may be used for taxiways. The color scheme may match the external conditions. As a result, the pilot can easily determine what type of surface on which the aircraft is being maneuvered by viewing the cockpit display 108.

Figure 4:
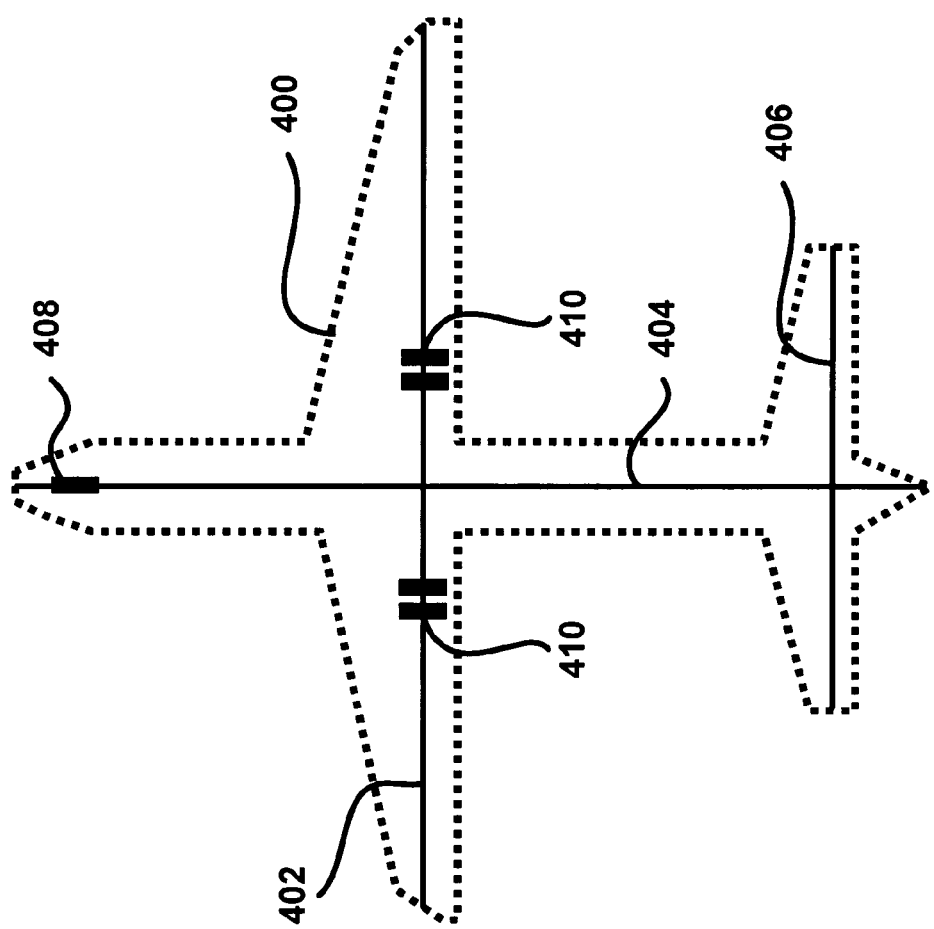
FIG. 4 is a pictorial diagram for generating aircraft symbology, according to an example.

Returning to FIG. 2, at block 204 the method 200 generates an aircraft symbol. The aircraft symbol is generated using data from the database 102, which can be better explained with reference to FIG. 4. FIG. 4 shows an outline (dashed line) of an aircraft 400. The aircraft 400 may be defined by a wing span length 402, a fuselage length 404, and a tail span length 406. FIG. 4 also depicts the location of the landing gear, which includes the nose gear 408 and the main gear 410.

The wing span length 402, the fuselage length 404, the tail span length 406, and the location of the nose gear 408 and the main gear 410 for a particular aircraft are supplied by the aircraft manufacturer and may be stored in the database 102. The display processor 106 uses the dimensions 402-406 to generate a generic aircraft symbol that is scaled in size to be proportional to the moving map representing the taxiway or runway on which the aircraft is located. An example of a generic aircraft symbol is shown in FIG. 5.

Figure 5:
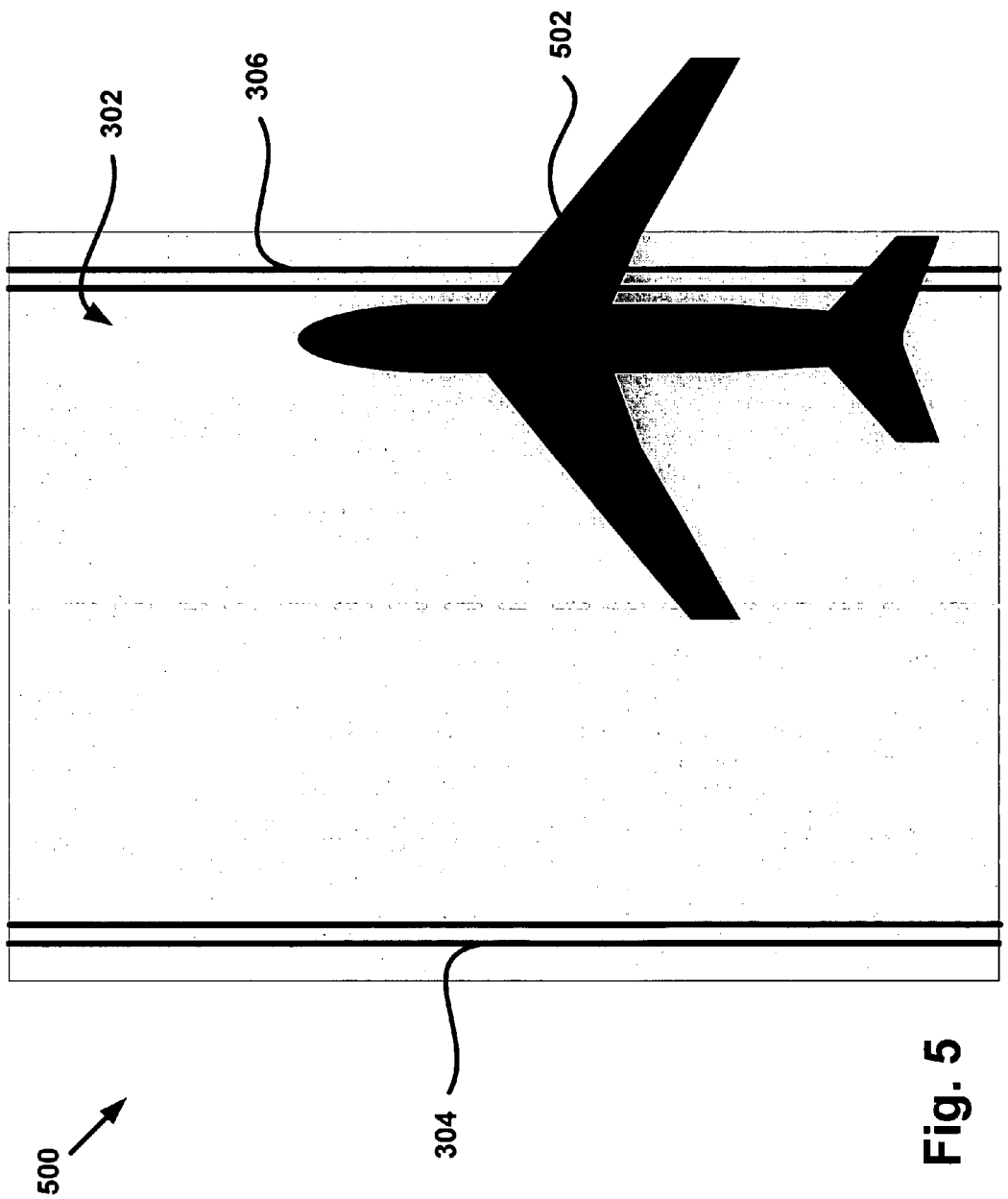
FIG. 5 is an example screenshot of a cockpit display showing aircraft symbology used in conjunction with taxiway edge markings.

FIG. 5 is an example screenshot 500 of a cockpit display showing an aircraft symbol 502 superimposed on a taxiway 302 having taxiway edge markings 304, 306. A pilot viewing the screenshot 500 can see the relationship of the aircraft symbol 502 to the edge markings 304, 306. The display processor 106 may position the aircraft symbol 502 on the moving map of the taxiway 302 using the GPS data 104.

Figure 8:
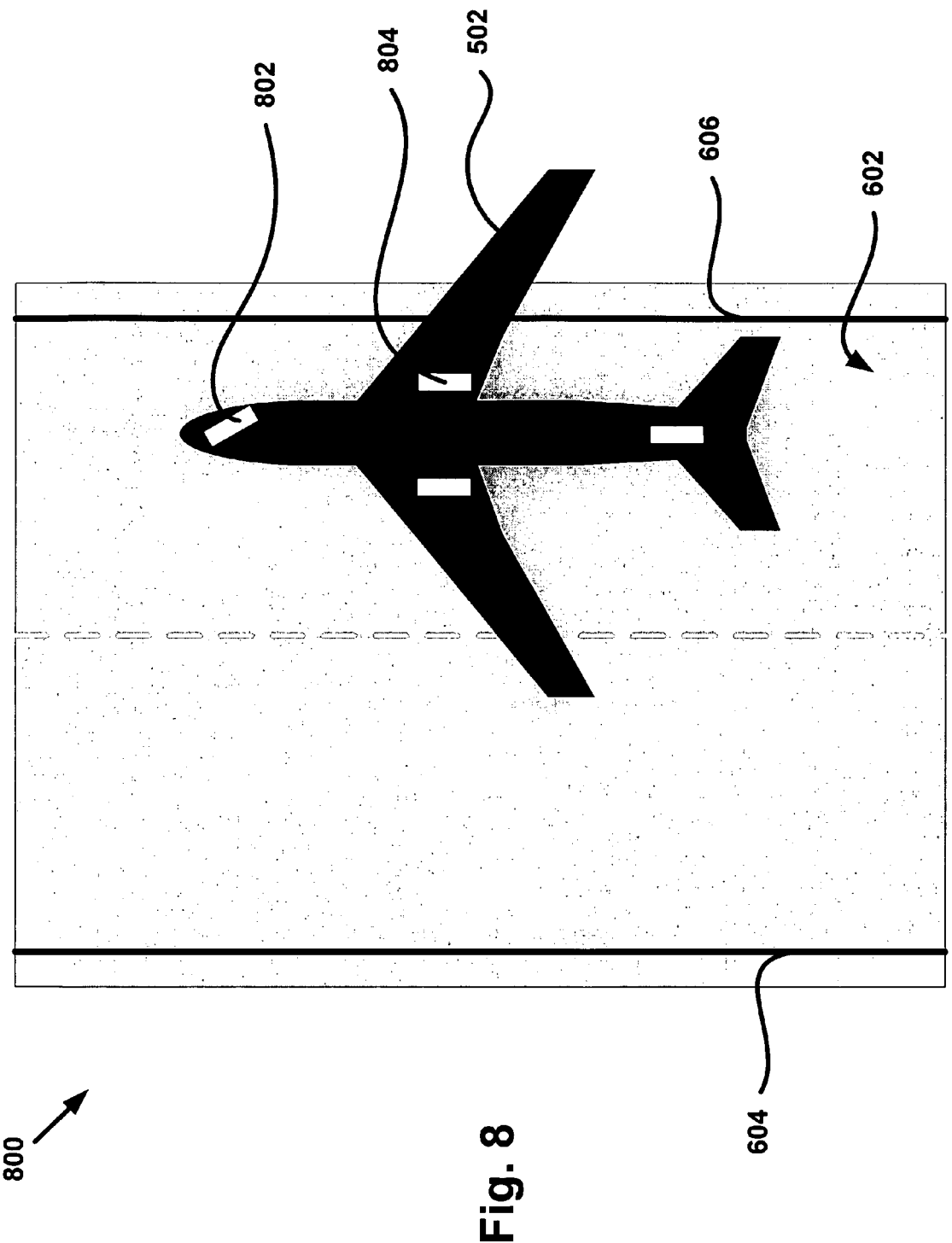
FIG. 8 is an example screenshot of a cockpit display showing aircraft symbology with a rotating nose gear.
Figure 9:
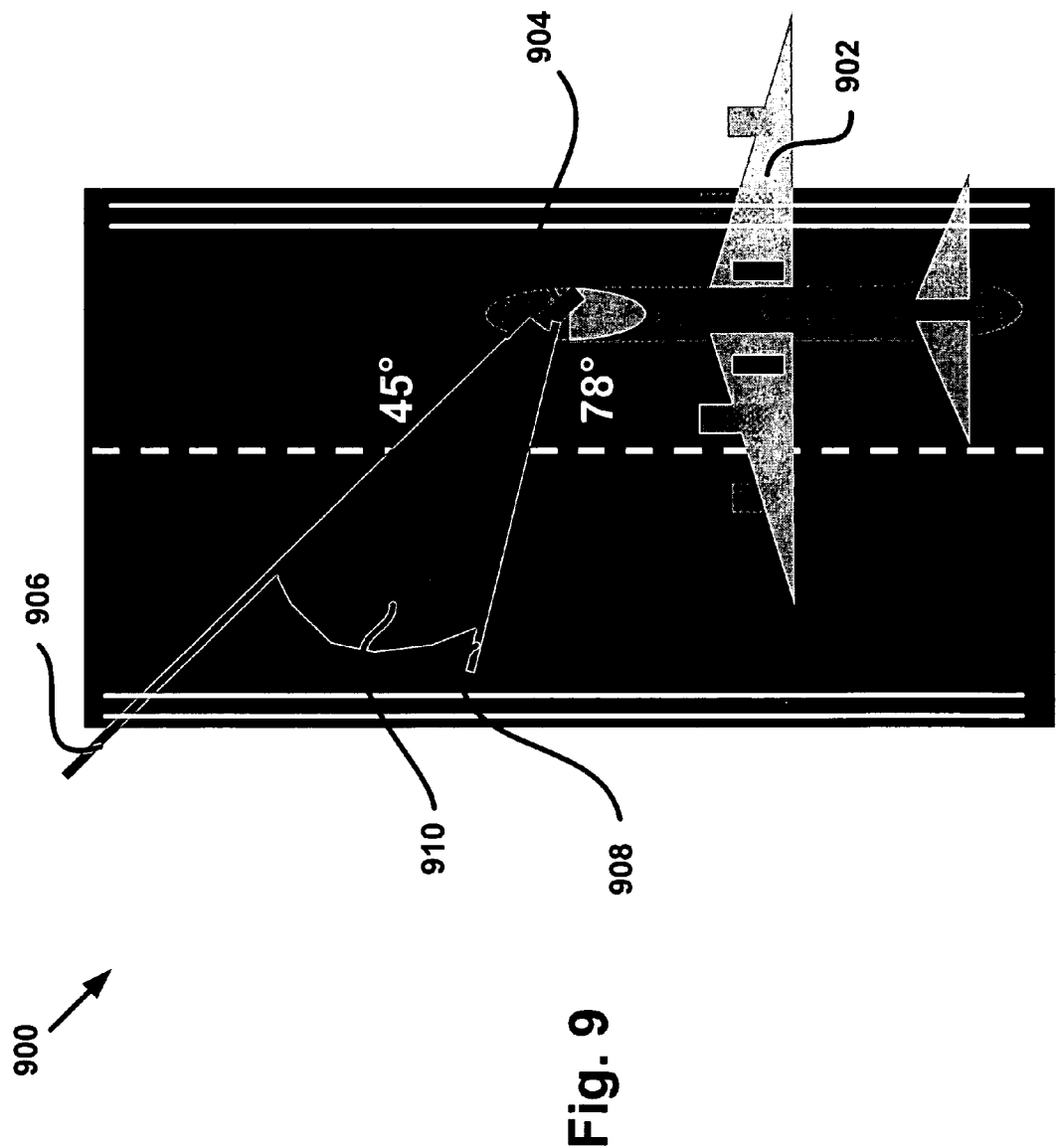
FIG. 9 is an example screenshot of a cockpit display showing a semi-transparent aircraft with turn guidance symbology.

The aircraft symbol 502 can be any recognized symbol for an aircraft and is not limited by the shape of the aircraft symbol 502 depicted in FIG. 5. Additionally, while the aircraft symbol 502 is shown in FIG. 5 as a solid color, the aircraft symbol 502 may have different designs to show additional features of the aircraft. For example, the aircraft symbol 502 may be designed to show the relationship between the surface and the landing gear as seen in FIGS. 8 and 9.

Figure 6:
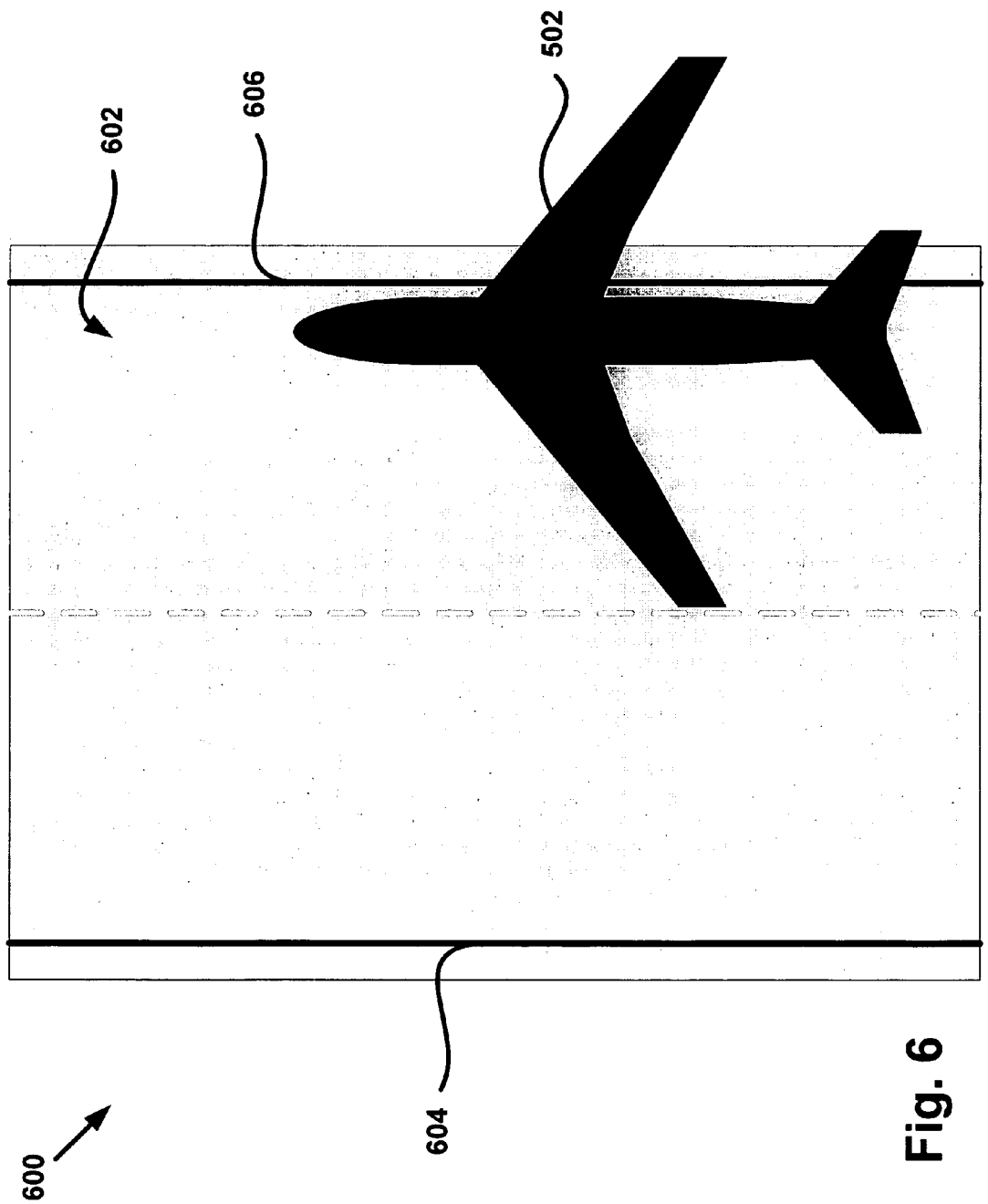
FIG. 6 is an example screenshot of a cockpit display showing aircraft symbology used in conjunction with runway edge markings.

FIG. 6 is an example screenshot 600 of a cockpit display showing the aircraft symbol 502 on a moving map of a runway 602 with runway edge markings 604, 606. As described above, the runway edge markings 604, 606 may be single line stripping located at both edges of a runway. By viewing the screenshot 600 on the cockpit display 108, the pilot can determine that the aircraft is on a runway and where the aircraft is in relationship to the runway edge markings 604, 606.

Figure 7:
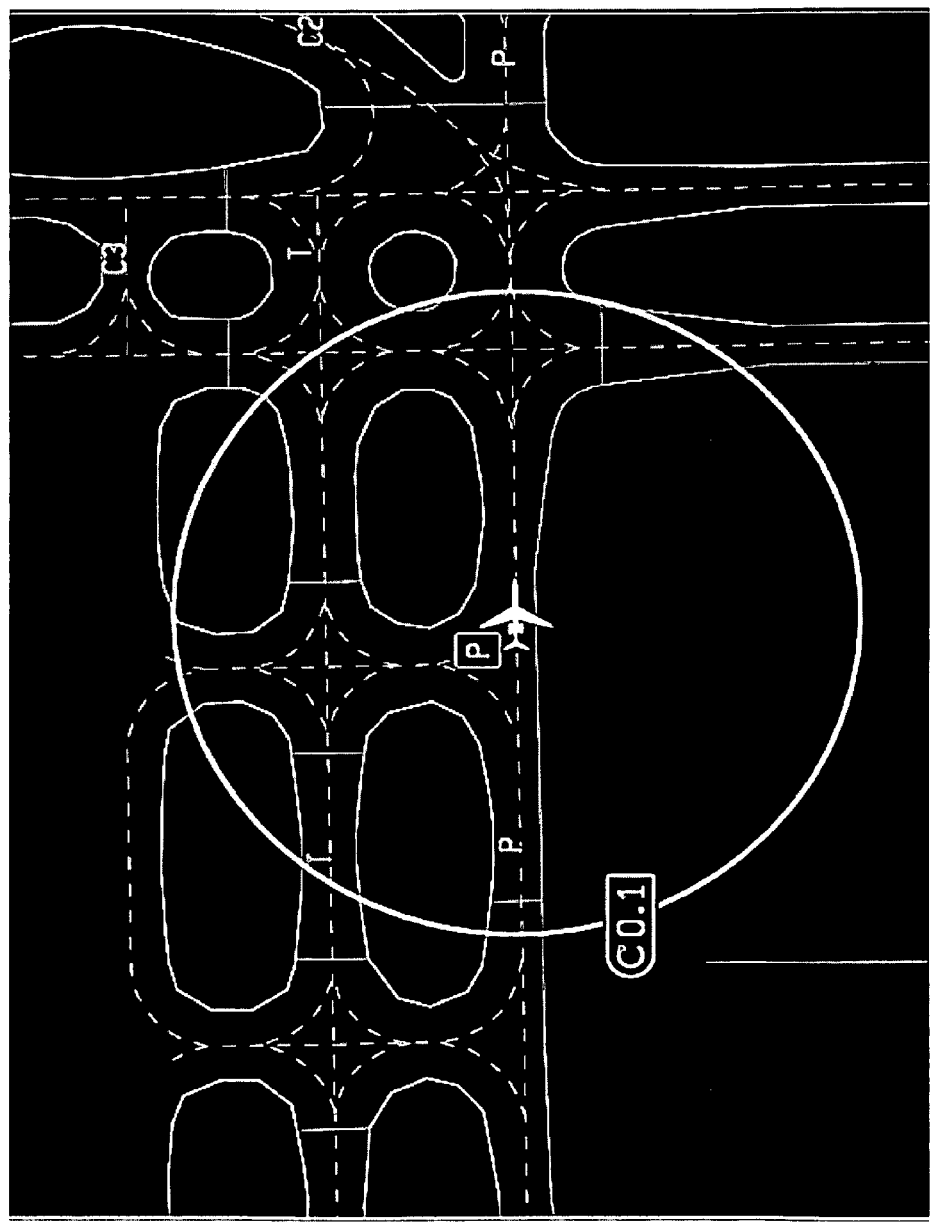
FIG. 7 is an example screenshot of a cockpit display showing aircraft symbology overlaying taxiway boundaries on a moving taxiway map.

The aircraft symbol 502 may also be overlaid on an expanded view of the moving map. FIG. 7 shows an example screenshot 700 of a cockpit display showing the aircraft symbol 502 overlaying the taxiway boundaries on a moving taxiway map. This larger perspective view may aid the pilot by allowing the pilot to see farther into the distance. The pilot may use the input device 110 to toggle between different views of the surface.

Returning to FIG. 2, at block 206, the method 200 generates landing gear symbology. As described before, the display processor 106 may obtain the position of the landing gear for a particular aircraft from the database 102. Symbology showing the location of the landing gear may be added to the aircraft symbol 502. The landing gear may be scaled to be proportional to the aircraft symbol 502.

FIG. 8 is an example screenshot 800 of a cockpit display showing the aircraft symbol 502 overlaid with nose gear 802 and main gear 804 symbology. The nose gear 802 and the main gear 804 are shown in their relative positions based on the data obtained from the database 102. Additionally, the nose gear symbol 802 may rotate to reflect the actual nose gear wheel rotation as the aircraft turns. The display processor 106 may use the nose gear steering angle input 104 to properly angle the nose gear symbol 802.

The screen shot 800 depicts the landing gear symbology 802, 804 as being a light color overlaying a darker colored aircraft symbol 502. However, other color schemes and patterns may be used to contrast the landing gear symbology 802, 804 from the aircraft symbol 502. Another example is provided in FIG. 9 in which the landing gear symbology is a darker color overlaying a semi-transparent aircraft symbol.

Figure 10:
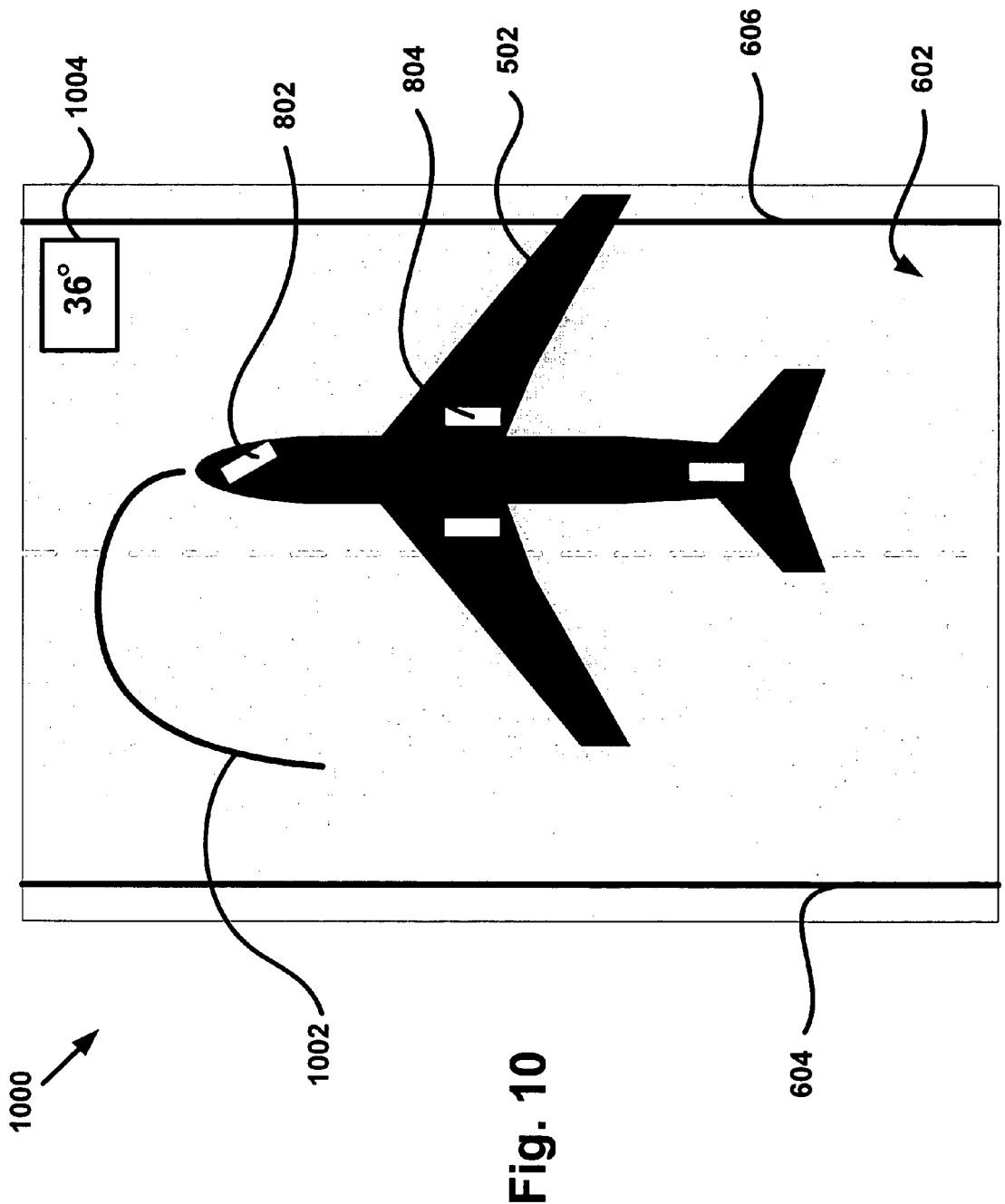
FIG. 10 is an example screenshot of a cockpit display showing turn radius trend vector.

Returning to FIG. 2, at block 208, the method 200 generates additional turn guidance symbology. The additional turn guidance symbology may include angle lines, trend lines, current and maximum steering angles, current ground speed, and any additional information that may aid the pilot when turning the aircraft. FIGS. 9 and 10 depict some examples of additional turn guidance symbology.

FIG. 9 is an example screenshot 900 of a cockpit display showing a semi-transparent aircraft symbol 902 overlaid with darker colored landing gear symbology 904. By making the landing gear darker than the semi-transparent aircraft symbol 902, the relationship between the wheels of the landing gear and the surface may be seen. The screenshot 900 also shows additional turn guidance symbology.

The additional turn guidance includes a current nose gear wheel steering angle line 906 and a maximum nose gear wheel steering angle line 908. The current nose gear wheel steering angle line 906 indicates a current nose gear wheel steering angle of 45°. Additionally, the maximum nose gear wheel steering angle line 908 indicates a maximum (i.e., full tiller) nose gear wheel steering angle of 78°. In addition to displaying the steering angle lines 906, 908, the display processor 106 may also overlay the numeric steering angles (45°, 78°) on the cockpit display as shown in FIG. 9.

The current and maximum nose gear wheel steering angles depicted in FIG. 9 are provided as a non-limiting example. The display processor 106 may obtain the current nose gear wheel steering angle from the cockpit tiller input from the pilot 104. Additionally, the display processor 106 may obtain the maximum nose gear wheel steering angle from the database 102. The information regarding the maximum nose gear wheel steering angle for a particular aircraft may be obtained from the aircraft manufacturer. Using this information, the display processor 106 may calculate a projected horizontal distance needed to turn the aircraft 180°.

The length of the steering angle lines 906, 908 represents the horizontal distance required to turn the aircraft 180°. As seen in FIG. 9, if the pilot attempts a 180° turn at the current steering angle, the aircraft will leave the taxiway and potentially get stuck off the taxiway. However, by increasing the steering angle, the aircraft can turn within the taxiway width. For example, at full tiller, the pilot can turn the aircraft 180° and stay within the edge markings. The shaded area 910 between the current and maximum nose gear wheel steering angle lines 906, 908 represents the amount of nose gear wheel angle remaining. By viewing the screen shot 900, the pilot can see how much nose wheel steering angle is available and whether the pilot can successfully implement a 180° turn.

FIG. 10 is an example screenshot 1000 of a cockpit display showing a turn radius trend vector 1002. The turn radius trend vector 1002 provides a visual guide as to whether the aircraft can make the turn within the edge markings 604, 606 as requested by the pilot. The display processor 106 obtains the current aircraft groundspeed and turning radius angle from the aircraft data 104 and calculates the turn radius trend vector 1002. The display processor then overlays the turn radius trend vector 1002 over the moving map. In this example, the pilot can turn the aircraft within the runway edge markings 602, 604.

Additionally, the screenshot 1000 depicts the current steering angle 1004. In a similar fashion, the screenshot may include the current aircraft groundspeed and any other additional information that may assist the pilot when making the decision of whether to make the turn. Viewing the screenshot 1000, the pilot can easily visualize whether the aircraft can safely turn given the current ground speed and turning angle radius.

By providing turn guidance symbology on the cockpit display 108, the pilot may have the information needed to evaluate the ability of the aircraft to make the requested turn. The turn guidance symbology includes edge markings, a scaled aircraft symbol that represents the position of the aircraft with respect to the taxiway or runway, and predictive symbology that provides a visual indication of whether a particular turn can be made safely. Actual data, such as steering angle and groundspeed, may also overlay the moving map to aid the pilot. As a result, the pilot can easily visualize the aircraft's landing gear in relationship to the runway or taxiway edge and avoid getting stuck in the mud.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

I claim:

1. A system for providing aircraft turning guidance, comprising:
    a display processor that receives data and overlays symbology on a movable map that is displayed on a screen, wherein the symbology includes an aircraft symbol that has a rotatable nose gear, and wherein the nose gear rotates relative to the remainder of the aircraft symbol as an aircraft represented by the aircraft symbol turns.

2. The system of claim 1, wherein the data is selected from the group consisting of aircraft dimensional data, aircraft turning radius data, runway dimensional data, taxiway dimensional data, and data available from the aircraft.

3. The system of claim 1, wherein the screen is a component of a cockpit display.

4. The system of claim 1, wherein the aircraft symbol is scaled in size to be proportional to the movable map.

5. The system of claim 1, wherein the aircraft symbol is semi-transparent so that a relationship between wheels of the aircraft and a surface on which the aircraft is located are visualized.

6. The system of claim 1, wherein the nose gear rotates in proportion to a nose gear wheel steering angle.

7. The system of claim 1, wherein the movable map is an image of a surface on which the aircraft is located.

8. The system of claim 7, wherein the surface is at least one of a taxiway and a runway.

9. The system of claim 1, wherein the symbology further includes edge markings.

10. The system of claim 1, wherein the symbology further includes a current nose gear wheel steering angle line and a maximum nose gear wheel steering angle line.

11. The system of claim 10, wherein a length of the current nose gear wheel steering angle line represents a horizontal distance required to turn the aircraft 180° at a current nose wheel gear steering angle.

12. The system of claim 10, wherein a length of the maximum nose gear wheel steering angle line represents a horizontal distance required to turn the aircraft 180° at a full tiller nose wheel gear steering angle.

13. The system of claim 1, wherein the symbology further includes a turn radius trend vector.

14. The system of claim 1, wherein the symbology further includes a current steering angle.

15. A navigation display system, comprising in combination:
    a screen for displaying data; and
    a display processor for receiving data and providing an output on the screen
    including symbology that overlays a movable map, wherein the symbology includes edge markings, an aircraft symbol with landing gear and rotatable nose gear, and a symbol that provides an indication of whether an aircraft is able to successfully e-an-turn and remain upon a surface on which the aircraft is located.

16. A method for providing turning guidance to a pilot who is maneuvering an aircraft on a ground surface; comprising in combination:
    generating an aircraft symbol that represents the aircraft on the ground surface, wherein the aircraft symbol has a rotatable nose gear;
    superimposing the aircraft symbol over a moving map that represents the ground surface, wherein the aircraft symbol is dimensioned to be substantially proportional to the dimensions of the moving map; and
    rotating the nose gear of the aircraft symbol relative to the remainder of the aircraft symbol based on a nose gear wheel steering angle input from the aircraft.

17. The method of claim 16, further comprising generating edge markings and superimposing the edge markings on the moving map.

18. The method of claim 16, further comprising generating a current nose gear wheel steering angle line and a maximum nose gear wheel steering angle line, and superimposing the current and maximum nose gear wheel steering angle lines on the moving map, wherein a length of the current nose gear wheel steering angle line represents a horizontal distance required to turn the aircraft 180° at a current nose wheel gear steering angle, and wherein a length of the maximum nose gear wheel steering angle line represents a horizontal distance required to turn the aircraft 180° at a full tiller nose wheel gear steering angle.

19. The method of claim 16, further comprising generating a turn radius trend vector and superimposing the turn radius trend vector on the moving map.

20. The method of claim 16, further comprising overlaying a current steering angle on the moving map.

* * * * *

UNITED STATES PATENT AND TRADEMARK OFFICE
CERTIFICATE OF CORRECTION

PATENT NO.        : 7,592,929 B2                                    Page 1 of 1
APPLICATION NO.   : 11/399240
DATED             : September 22, 2009
INVENTOR(S)       : David Pepitone It is certified that error appears in the above-identified patent and that said Letters Patent is hereby corrected as shown below:

Column 8, line 23, "e-an-turn" should be changed to --turn--.

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO.        : 7,592,929 B2                                              Page 1 of 1
APPLICATION NO.   : 11/399240
DATED             : September 22, 2009
INVENTOR(S)       : David Pepitone It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Twenty-first Day of September, 2010

David J. Kappos
*Director of the United States Patent and Trademark Office*